United States Patent [19]

Rashid

[11] Patent Number: 5,666,727
[45] Date of Patent: Sep. 16, 1997

[54] METHOD OF MANUFACTURING A PASSENGER COMPARTMENT FROM A CYLINDRICAL TUBE

[75] Inventor: Moinuddin Sirdar Rashid, Bloomfield Hills, Mich.

[73] Assignee: General Motors Corporation, Detroit, Mich.

[21] Appl. No.: 390,841

[22] Filed: Feb. 17, 1995

[51] Int. Cl.$^6$ ........................................... B23P 17/00
[52] U.S. Cl. ........................... 29/897.2; 29/421.1; 72/61
[58] Field of Search ................................ 29/421.1, 557, 29/897.2; 72/55, 61, 54, 62; 228/170, 173.2, 173.4, 155, 157; 264/520, 573

[56] References Cited

U.S. PATENT DOCUMENTS

| | | | |
|---|---|---|---|
| 1,634,433 | 7/1927 | Ortloff . | |
| 2,298,132 | 10/1942 | Johnson | 72/55 |
| 2,710,770 | 6/1955 | Barenyi | 296/28 |
| 4,567,743 | 2/1986 | Cudini | 29/421.1 |
| 4,900,083 | 2/1990 | Kumasaka et al. | 296/197 |
| 4,914,802 | 4/1990 | Takao et al. | 29/469 |
| 4,940,282 | 7/1990 | Townsend | 296/204 |
| 5,070,717 | 12/1991 | Boyd et al. | 29/421.1 |
| 5,333,775 | 8/1994 | Bruggemann et al. | 228/157 |
| 5,431,326 | 7/1995 | Ni et al. | 29/421.1 |

FOREIGN PATENT DOCUMENTS

| | | | |
|---|---|---|---|
| 2 044 089 | 2/1971 | France . | |
| 403 982 | 10/1924 | Germany . | |
| 421 979 | 5/1926 | Germany . | |
| 1 906 875 | 12/1964 | Germany . | |
| 3 706 700 | 6/1987 | Germany . | |
| 8807208 U | 9/1988 | Germany . | |
| 56737 | 5/1981 | Japan | 72/54 |
| 225 087 | 4/1943 | Switzerland . | |
| 295 873 | 3/1954 | Switzerland . | |
| 547 975 | 3/1945 | United Kingdom . | |

*Primary Examiner*—David P. Bryant
*Attorney, Agent, or Firm*—George A. Grove

[57] ABSTRACT

Unitary vehicle body compartment structures of the type comprising wall members and/or interconnected frame members that define the surface of a cylinder are made by providing a tube that is initially smaller than the cylinder and expanding at least portions of the tube to the shape of the body compartment structure. Functional openings such as windows are trimmed from the deformed tube to further define the compartment. A complete body may be assembled by attaching two or more such compartments such as, e.g., a passenger compartment, an engine compartment and a luggage compartment. Tube or tube segments may also be employed to make segments of the body compartment or smaller body parts such as doors and hoods.

5 Claims, 2 Drawing Sheets

METHOD OF MANUFACTURING A PASSENGER COMPARTMENT FROM A CYLINDRICAL TUBE

TECHNICAL FIELD

This invention relates to automotive vehicle bodies and components thereof and methods of their manufacture.

BACKGROUND OF THE INVENTION

Currently, automotive bodies are made from sheet steel and/or polymer composites. They typically consist of 150 to 200 parts of varying complexity which are fabricated and then joined together to form the assembled body. The sheet metal parts are usually stamped and the polymer panels are molded. A large number of separate components are required because of current material and manufacturing limitations. However, joining these parts requires tabs, flanges and fixturing which increase their complexity and cost. Also, joints are a potential source of quality problems such as poor fit and finish, squeaks and rattles.

Body manufacturing costs for tools, assembly fixtures and facilities are directly related to the number of parts required to make the body. Hence, to reduce cost and increase quality, the number of body parts and joints should be reduced.

SUMMARY OF THE INVENTION

The present invention provides a new method for making a totally integrated body member or large unitary body substructures which incorporate or eliminate many of the multitude of smaller parts and joining operations required by current body architecture and manufacturing practices. For example, as applied to a conventional sedan automobile having a passenger compartment, engine compartment and trunk, the main body structure may be divided into these three separate structures or compartments, each of which may be formed primarily from a single tubular blank of formable, suitable structural material composition. The forming of each tube shapes it into a unitary configuration of the respective compartment, e.g., the passenger compartment. Further shaping of portions of the compartment may then be undertaken and unneeded portions trimmed away— such as for windows. The separate unitary compartment structures are then attached together to form the main body structure.

Optionally the invention further provides a method of making body components, such as doors, quarter panels and other body pieces, from a tubular blank or tube segment as a starting material. Thus, the practice of the invention utilizes relatively thin wall tubes or tube segments that are comparable in size to the vehicle body sections or body components that are to be formed. This practice works because the shape of vehicle compartments is generally cylindrical, and tubes can be deformed within practical limits to duplicate their shape. One suitable method of forming tubes of such cross-section and shape comprises providing a sheet (e.g., a steel or aluminum alloy sheet), shaping or bending the sheet to make the desired circular, elliptical or polygonal tubular cross-section and welding the touching edges into a strong seam.

While the tubular blanks may be made by any suitable process, it is another aspect of the invention to form the tubes, tube segments and even suitably-shaped body components by extrusion from an alloy having a multiphase microstructure suitable for forming at an elevated temperature as a soft, partly liquid, partly solid (semi-solid) mass. Where the tooling, energy requirements and press size for conventional solid extrusion of large tubular blanks may be considered excessive, the subject practice of semi-solid extrusion can be utilized to make such large blanks and other tubular extrusions with smaller, less expensive extrusion equipment and with reduced energy requirements. It is contemplated that semi-solid extrusion can be used to make whole vehicle body sections and smaller components such as panels, doors, hoods, trunk lids, fenders and the like.

Forming of tubular blanks or other extruded part precursors into the shapes required for body sections or components may be accomplished by any known and suitable process. Typically, a first step is to press or expand the tube or tube segment into a die cavity or a series of die cavities to form and trim the components. Subsequent forming steps, if necessary, may comprise roll-forming or stretching of the extruded precursor or the die-formed part to conform it to the ultimately desired shape. Obviously, the specific forming steps on the large tubular blanks are a matter of design or choice, but starting with large tubular blanks permits a reduction in number of vehicle body parts by the formation of large unitary structures and simplification of vehicle body manufacture. There will be applications in which it will be preferred to employ the tubular blank or other shaped precursor workpiece in a superplastically-formable microstructure or condition. Utilization of such highly formable materials permits the single step formation of complex shapes to eliminate parts and subsequent joining operations.

These and other features and advantages of the invention will be more fully understood from the following description of certain specific embodiments of the invention taken together with the accompanying drawings.

DESCRIPTION OF AN EMBODIMENT OF THE INVENTION

The invention will be initially described in terms of making automotive vehicle bodies and body compartments. However, the practices described are applicable to making segments or portions of body compartments, smaller body panels and components, and, of course, non-vehicle articles of manufacture.

Main Body Structure

Figure 1:
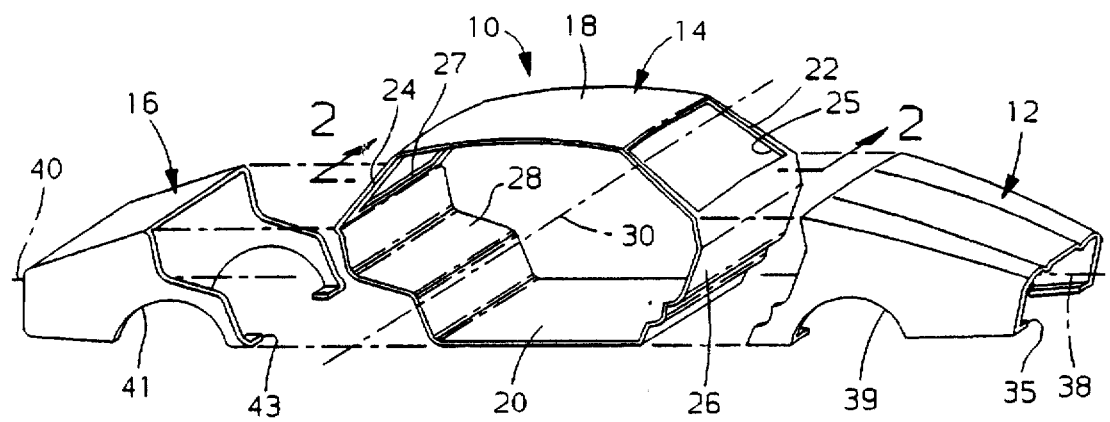
FIG. 1 is an exploded pictorial view showing the general form of an automotive passenger vehicle body formed according to the invention.

Referring now to the drawings in detail, FIG. 1 illustrates the general form of an automotive passenger vehicle body generally indicated by numeral 10. The doors as well as the front end grill, the rear end vertical closure and the bumpers are omitted from the figure. In preparation for manufacture of the body, a mathematical representation of the body configuration is usually generated by the body designer. This math data is suitably used as the master for tube shape specification, die design and the like in the manufacturing process.

Primary steps in the process of forming a body according to the present invention may include:

1. Dividing the body shape into a small number of logical major compartments or compartment segments;
2. Providing a tubular blank(s) for each such compartment or segment, preferably having external dimensions approximating those of the body compartment to be made;
3. Forming or shaping the blank(s) into the final desired configuration(s) of the respective compartment; and, if appropriate,
4. Joining the body compartment members to form an integrated body.

The illustrated body structure 10 can be divided into three logical major compartments, an engine compartment 12, a passenger compartment 14 and a luggage compartment 16. Obviously for other types of vehicle bodies, or for other articles of manufacture, alternative forms of segmentation may be used. However, the shapes of the aforementioned compartments are those of cylinders with irregularly-shaped circumferences, and this invention utilizes tubes in the manufacture of such compartments.

Figure 2:
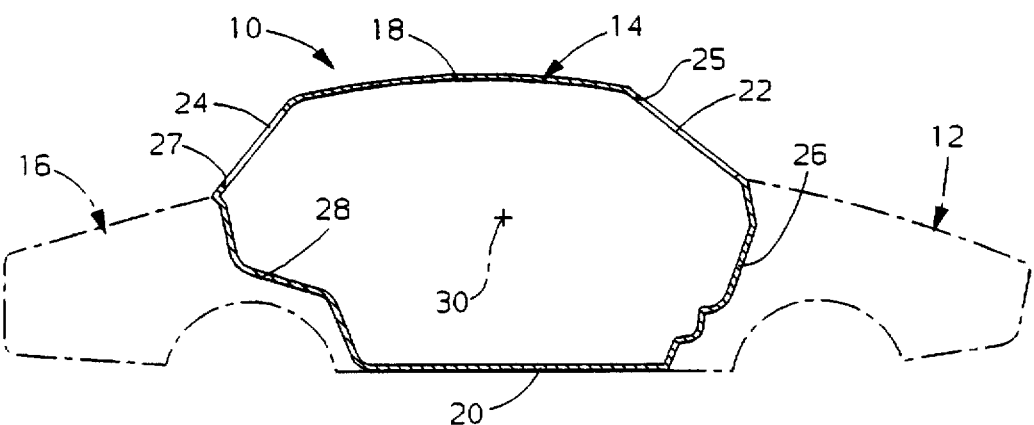
FIG. 2 is a cross-sectional view showing the passenger compartment in the body.

The tubular blanks used to make each major compartment or structure may differ in size and shape. FIG. 2 illustrates the cylindrical cross-sectional configuration of the passenger compartment 14 as it is integrated into the body 10. As formed, the passenger compartment 14 consolidates numerous separate parts in current bodies including, but not limited to, the roof 18, floor pan 20, A- and C-pillars 22, 24 respectively, firewall 26, the rear seat support 28, as well as., if desired, a rear shelf and assorted fixtures and brackets. Note that the open ends of the passenger compartment body segment 14 are on the sides of the vehicle where the side doors will be placed so that the axis 30 of the tubular blank lies parallel with the transverse axis of the vehicle. If desired, the passenger compartment 14 could be formed from a blank having an axis parallel with the longitudinal axis (not shown) of the vehicle; however, the transverse axis is preferred for the passenger compartment configuration illustrated.

Figure 3:
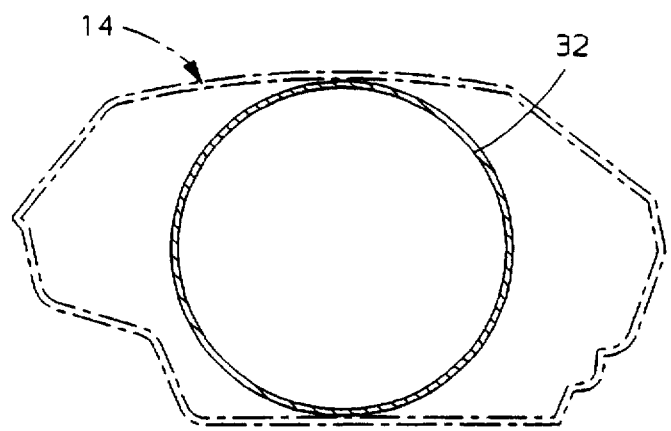
FIG. 3 is a cross-sectional view showing formation of the passenger compartment segment from a circular tubular blank.

FIG. 3 illustrates a tubular blank 32 of circular cylindrical cross-section from which the passenger compartment 14 of FIG. 2 may be formed. Alternatively, the compartment could be formed from a tubular blank 34 of elliptical cylindrical cross-section, FIG. 4, or a tubular blank 36 of polygonal cylindrical cross-section, FIG. 5, formed to the approximate dimensions required of the final compartment illustrated. The length of the tubular blank will be determined by the overall width of the body and the thickness of the material by the structural requirements of the completed compartment.

The choice of the cylindrical cross-sectional configuration of the initial tubular blank will depend on engineering and practical considerations. For example, a circular blank may be readily available and inexpensive because it can be used in making many different bodies or other parts. However, a polygonal cross-section closely approximating a final shape can be less ductile because less deformation is required to obtain the final shape.

FIG. 1 illustrates the finished form of the engine compartment 12 to be attached (e.g., by welding) to the passenger compartment 14 of the body 10. The engine compartment 12 may be made from an elliptical tubular starting blank. The axis 38 of the blank and the engine compartment segment 12 formed therefrom is in general parallel to the longitudinal axis of the vehicle body 10 as the figure illustrates. Thus, the two open ends of the tube are situated at the front end of the vehicle and the firewall. The length of the tube will be determined by the length of the engine compartment and the thickness of the material by the structural requirements of the compartment. As depicted in FIG. 1, the engine compartment body segment 12 has been formed against a die or succession of dies as described below and a substantial part of the tube blank trimmed away to define wheel openings 39 and the under body opening 35. The formed engine compartment 12 will preferably consolidate several separate parts from current bodies including, but not limited to, front fenders or like panels, hood, wheel wells, structural reinforcements, cross-members, and assorted brackets and fixtures. Trimmed away materials may, of course, be used to provide additional structural elements to such engine cradles, battery platforms, additional support members and the like. The hood has not been trimmed from segment 12 as depicted but would be in a subsequent forming operation. The forming operations producing compartment 12 could include perforating edges of the hood to facilitate its removal. The removal of the hood would leave a structural member across the top (left end in FIG. 1) connecting the side walls of the engine compartment.

FIG. 1 also illustrates the completed body 10 including the luggage compartment 16 which may be made from a tubular blank of circular cross-section. As with the engine compartment, the axis 40 of the luggage compartment is longitudinal, or parallel with the longitudinal axis of the vehicle body. Thus the two open ends of the formed compartment are situated at the rear end of the vehicle and the rear seat structure. The length of the tube will be determined by the length of the luggage compartment and its thickness by the structural requirements of the luggage compartment structure. At the stage of manufacture depicted by compartment 16 in FIG. 1, the trunk lid has not been severed from the structure. However, a major portion of the original tube has been trimmed away to form wheel openings 41 and the underbody opening 43, and to accommodate a fit with the irregularly-shaped rear seat support 28 of the passenger compartment 14. Compartment 16 structure is a unitary structure that includes many pieces that in prior art practices are separately made and then joined together.

Figure 4:
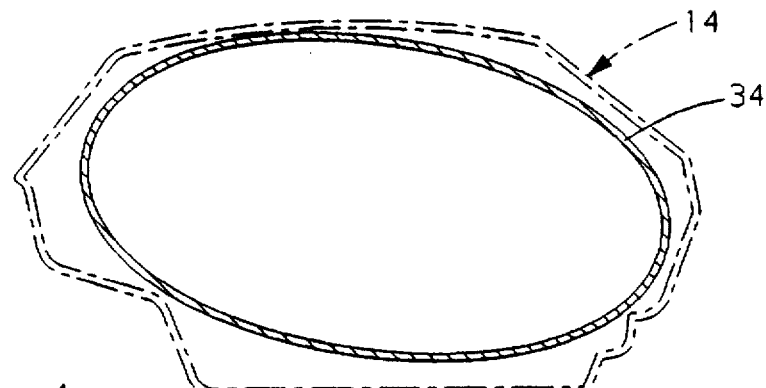
FIG. 4 is a view similar to FIG. 3 showing the use of an elliptical tubular blank.
Figure 5:
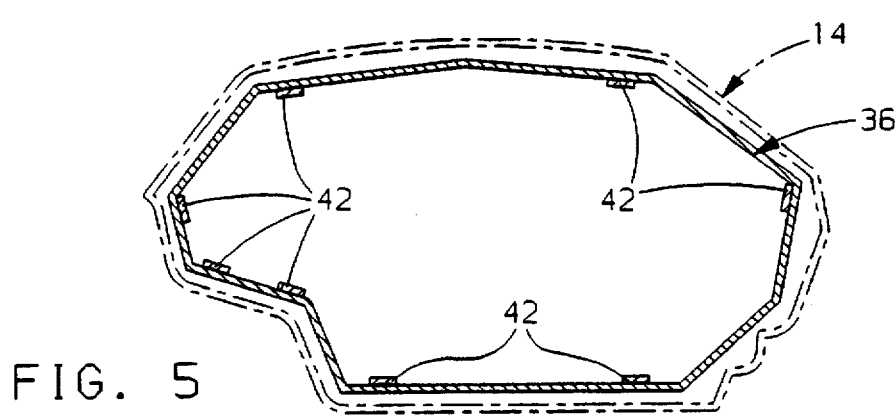
FIG. 5 is a view similar to FIGS. 3 and 4 illustrating formation of the passenger compartment using a polygonal tubular blank approximating the finished configuration of the segment.

The tubes illustrated in FIGS. 3 through 5 may be made by standard sheet metal fabrication techniques in which the sheet is curved until the edges meet and are welded together. Alternatively, and often preferably, the tubes may be made as seamless tubes by extrusion. Extruded tubes offer significant design advantages over tubes fabricated from sheet material because of the easier ability to vary the cross-sectional thickness at segments around the circumference of the tube. Conventional techniques may be used to make extruded tubes for a passenger compartment or other major segments; however, such large tubes are likely to require excessive pressures or larger dies than are currently available.

Tube blanks, whether shaped from sheets or extruded, can be made to closely conform in their cross-section to that of the vehicle compartment segment to be made therefrom. For example, FIG. 5 shows such an arrangement illustrating a vehicle compartment 14 profile with a superimposed formed or extruded tube 36 shown within and slightly smaller than the passenger compartment form. The tube 36 includes a number of axially extending stiffeners 42 positioned as necessary to provide adequate stiffness to the vehicle passenger compartment structure. Stiffeners 42 may be coextruded with tube body 36 or applied to the sheet material from which the body is formed.

Shaping of Tubes or Tube Segment Blanks

The first step in the shaping of the starting tubes of suitable cross-section comprises expanding or otherwise pressing the tube against a die surface defining the configuration of the body member to be formed.

Figure 6:
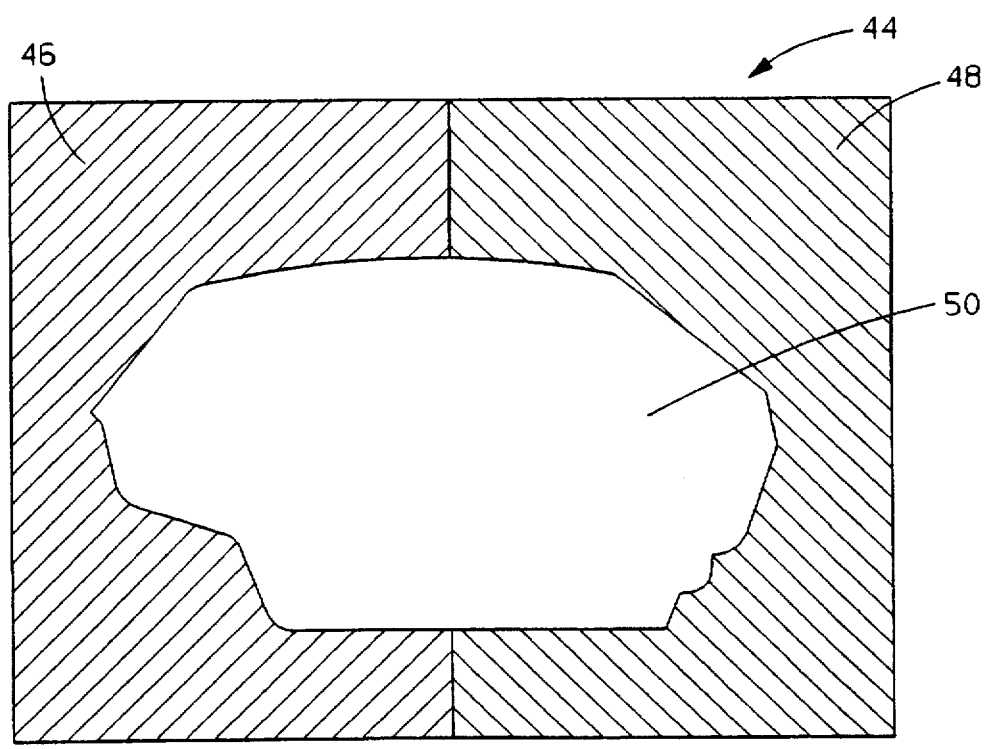
FIG. 6 is a cross-sectional view of a die for forming the passenger compartment of FIG. 5.

FIG. 6 illustrates a die 44 in cross-section including two parts 46, 48 which, when closed as shown, define a cavity surface 50 that accurately duplicates the desired shape of the passenger compartment 14. To shape the tube into this final shape, the tube, e.g., tube 36, is placed inside the die cavity 50 in the position shown in FIG. 5. The two ends of the tube are then sealed with suitable fixtures (not shown) and tube 36 is heated by means not shown and pressurized with an appropriate fluid, e.g., through a fixture at one end. The whole assembly is held at the proper pressure and temperature for a sufficient time for the simple tube to expand coextensively against the die surfaces 50. The original tube blank 36 has now been shaped into the cross-sectional configuration of, e.g., passenger compartment 14. Die forming processes which can be used for such shaping of the tube include hydro-forming, superplastic forming, electro- or magneto-forming, and electro-hydraulic or magneto-hydraulic forming. Trimming of the edges of the formed tube as required may be accomplished by any known method.

The shaped and trimmed tubes forming the body segments such as 12, 14, 16 are then welded together or otherwise attached to form an integral body member 10 as shown for example in FIGS. 1 and 4. Assembly of these segments may be by welding in known manner or by any other suitable means which will accomplish the purpose.

It is recognized that the initial die forming operation on the tube blank may not be sufficient to complete the shaping of the tube to its desired body segment shape. This may be due, for example, to the limits of die practice or to the formability of the tube material. Thus, additional forming steps, heat treatment steps, trimming or perforating steps or the like may be required to bring body compartments 12, 14 and 16 to a final configuration. For example, the window openings 25 and 27 in passenger compartment 14 must be trimmed away. Likewise, the wheel openings 39 and 41 and underbody openings 35 and 43 must be removed from the tubes from which engine compartment 12 and luggage compartment 16 are formed.

While it is contemplated that a single tube starting material or blank will ultimately be the principal source of the unitary body structure it embodies, it is recognized that additional small components such as brackets and stiffeners may later be attached. However, the subject practice will reduce the number of separate body parts and facilitate easier assembly of the parts still required.

The above practices have been described for illustration in the making of whole unitary body compartments. The same or analogous steps are followed if a given compartment (e.g., passenger compartment 14) is to be made by separately forming a few large panels and forming them. Similarly, the invention can be used to make body components such as doors, hoods, quarter panels and the like.

Semi-Solid Extrusion

Extrusions are made by forcing a billet or workpiece of solid metal through a die orifice under high pressure. Depending upon the part and the material, extrusion may be conducted at room temperature or at a suitable elevated temperature. Automotive applications of metal extrusions have included decorative trim, seat rails, bumpers and space-frame components. The large forces required to extrude solid material through a die orifice have limited the size of extrusions although extrusions with larger cross-sections offer additional economic and manufacturing advantages.

The present invention provides and employs a new form of extrusion process—semi-solid extrusion—to make (among other articles of manufacture) suitably large tubes, tube segments and other extruded precursors for vehicle body structures. Semi-solid extrusion permits the use of smaller forces for making extrusions than does current practice so that larger cross-sections can be extruded without departing drastically from current press and die technology. The characteristic feature of semi-solid extrusion is the utilization of a billet of material with a rheocast or like microstructure that is heated to and processable in a semi-solid state. In the semi-solid state, the material has a liquid phase and usually a spheroidal solid phase. The mixed phases (i.e., semi-solid) cooperate to constitute a self-sustaining but easily shapeable mass. In fact, the flow properties of such a mass of many alloys (e.g., aluminum, copper and magnesium base alloys) is thixotropic. They flow easier under mildly increasing pressure. The flow stress of the semi-solid metal is very low, especially as compared to the extrusion forces necessary to extrude other solid metals which cannot be converted to a hot, self-sustaining, thixotropic, partly liquid, partly solid state. Hence much lower forces are required to force semi-solid material through an extrusion die. Much larger extrusions can be made by extruding semi-solid materials than are considered practicable today with conventional compositions. The process is well suited for suitable aluminum and magnesium alloys but is also applicable to other structural material including, but not limited to, steels, polymer composites and metal composites.

The solid billets used in current hot or cold extrusion have either an as-cast or homogenized microstructure. The as-cast microstructure consists of a non-homogenous distribution of dendrites. The flow stress of cold-extruded aluminum alloys is in the range of 25,000 to 35,000 psi. The flow stress of the same alloys when they are hot extruded is reduced by an order of magnitude to approximately 2,500 to 3,500 psi.

As indicated above, billets of metal alloy suitable for semi-solid forming are sometimes said to have rheocast microstructures. They consist of a uniform distribution of a spherical or globular phase within a lower melting point matrix. They are often made by stirring a molten bath of the alloy, as it solidifies, to break up the dendrites (thus, the term "rheocast"). Stirring may be mechanical or electromagnetic. The liquid-solid slurry is then either cast into a mold or continuously cast to solidify with a rheocast microstructure. Rheocast microstructures have also been obtained by heat treatment.

Rheocast materials formed into billets have been used to make articles of manufacture by methods other than extrusion. Typically the billet is heated into the two phase region of the phase diagram where the alloy exists as a slurry of liquid and solid until it slumps but does not liquify. The semi-solid billet is then squeeze or die cast, or forged into the component. The forces needed to deform the semi-solid material are very low, less than 10 psi, which is four orders of magnitude smaller than that needed for cold extrusion. In the present invention, the low forces needed to deform semi-solid rheocast material are exploited for semi-solid extrusion of tubular starting materials or the like. Since the rheocast semi-solid material has a very low flow stress at its semi-solid temperature, very low forces are sufficient to extrude this material, and once it is shaped by passage through a suitable die, it is cooled to solidify its desired shape. This practice is to be used to make large tubes or large tube segments for making body compartments or smaller body components as described herein.

Body Components

While the use of large tubes is particularly useful in making integral vehicle compartment body structures, such tubes or tube segments may also be used to make smaller body components such as doors or hoods or deck lids. These components can be made from tubes even when the main body structure is not.

A variation of the present invention involves the process of making one or more components for products such as automotive bodies by forming them from a tube or tube segment. The process is based upon the use of a tubular or partly tubular preform as a blank from which to form the component(s) in a die. Subsequently, excess material is trimmed away to leave one or more components.

Using any one of suitable known extrusion processes or the semi-solid extrusion process referred to earlier in the present invention, a tubular segment preform is made having the curved shape of a hood, door or other part to be manufactured and having a cross-section with reinforcing elements suitable to provide the appropriate weight and stiffness desired for the part. In other words, the tube or tube segment has longitudinal reinforcements or stiffeners formed integrally along the length of the curved preform. The tubular preform is shaped in a die to form and trim the hood, door or other component of complex curvature. It may be desirable to further shape the component by other suitable processes to its final configuration.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of making a passenger compartment structure for a motor vehicle, said passenger compartment structure having a first axis to be aligned with the fore/aft direction of motion of the vehicle and a second axis transverse to said first axis, said structure further comprising interconnected front, rear, top and floor portions that together define an enclosed cylindrical cross section, the axis of said cylindrical cross section being aligned with said second axis; said method comprising expanding an open-ended cylindrical tube against a die member so that the expanded tube takes the shape of said passenger compartment structure.

2. The method as recited in claim 1 in which the open-ended tube to be expanded has a cross-sectional configuration uniformly smaller than but similar to the peripheral outline of the passenger compartment structure.

3. The method as recited in claim 1 comprising the additional step of joining an engine compartment structure to the front portion of the passenger compartment structure.

4. The method as recited in claim 1 comprising the additional step of joining a luggage compartment structure to the back portion of the passenger compartment structure.

5. A method as recited in claim 1 comprising the additional step of trimming away portions of the expanded tube to make functional openings in said passenger compartment structure.

* * * * *